United States Patent
Ohkawa

[11] 3,930,440
[45] Jan. 6, 1976

[54] DEVICE FOR CONVEYING ROLLED FOOD

[75] Inventor: Nobuyoshi Ohkawa, Amagasaki, Japan

[73] Assignee: Daieigiken, Inc., Amagasaki, Japan

[22] Filed: Mar. 12, 1974

[21] Appl. No.: 450,490

[52] U.S. Cl. ............... 99/450.6; 198/156; 198/219
[51] Int. Cl.² ..................... A21C 9/06; A21C 11/00
[58] Field of Search .......... 99/450.1, 450.6; 198/19, 198/135, 156, 219; 53/209

[56] References Cited
UNITED STATES PATENTS
3,633,517  1/1972  Kao................................. 99/450.6
3,770,107  11/1973  Michelbach ................... 198/156 X Primary Examiner—Harvey C. Hornsby
Assistant Examiner—Alan Cantor
Attorney, Agent, or Firm—Tab T. Thein

[57] ABSTRACT

Device for conveying or transferring rolled food, namely semi-finished materials in a chain of procedural steps to the next step. A comb-shaped cradle is secured to each stage processing device, and travelling comb-shaped cradles pass the fixed cradles upwardly, thus the materials on the fixed cradles are moved to the travelling cradles. The latter move above the fixed cradles of the next stages and pass the fixed cradles downwardly, thus the semi-finished materials are put on the fixed cradles of the next stages.

5 Claims, 5 Drawing Figures

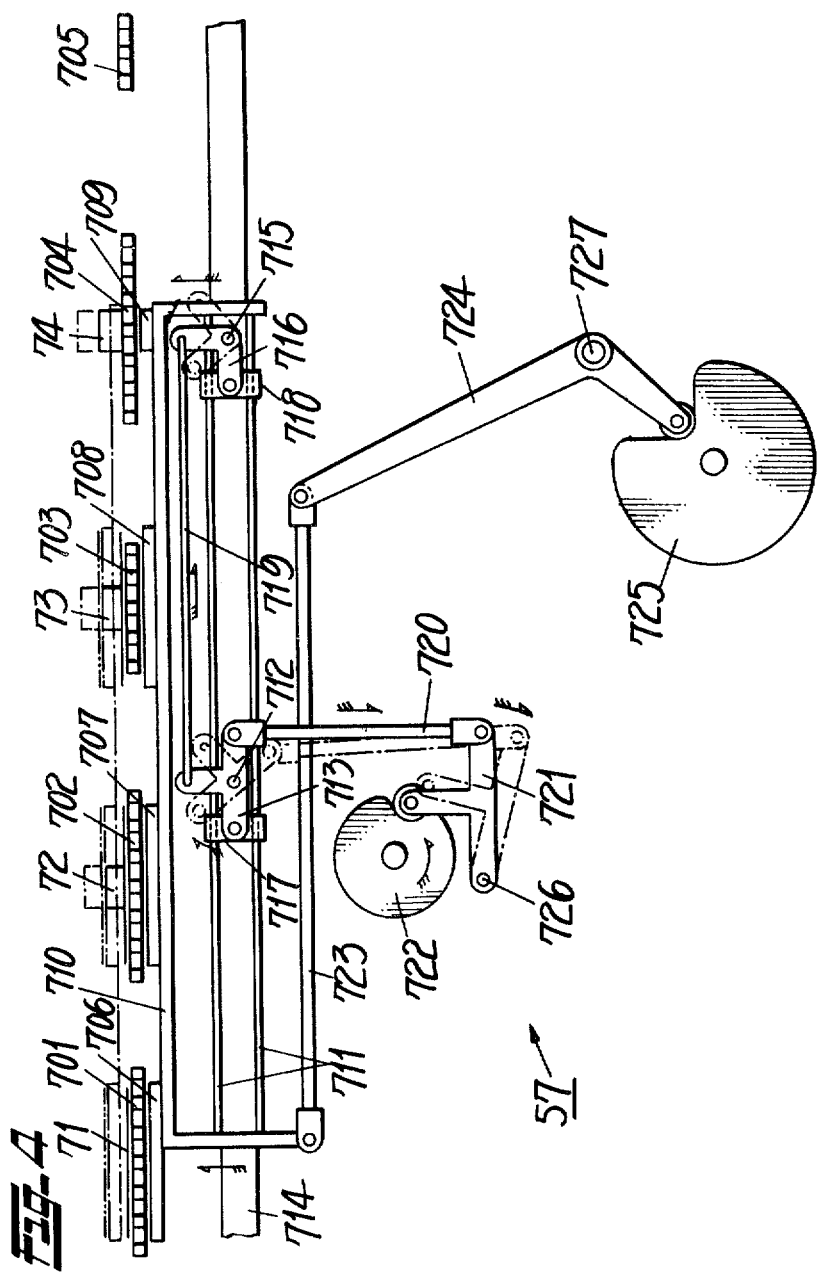

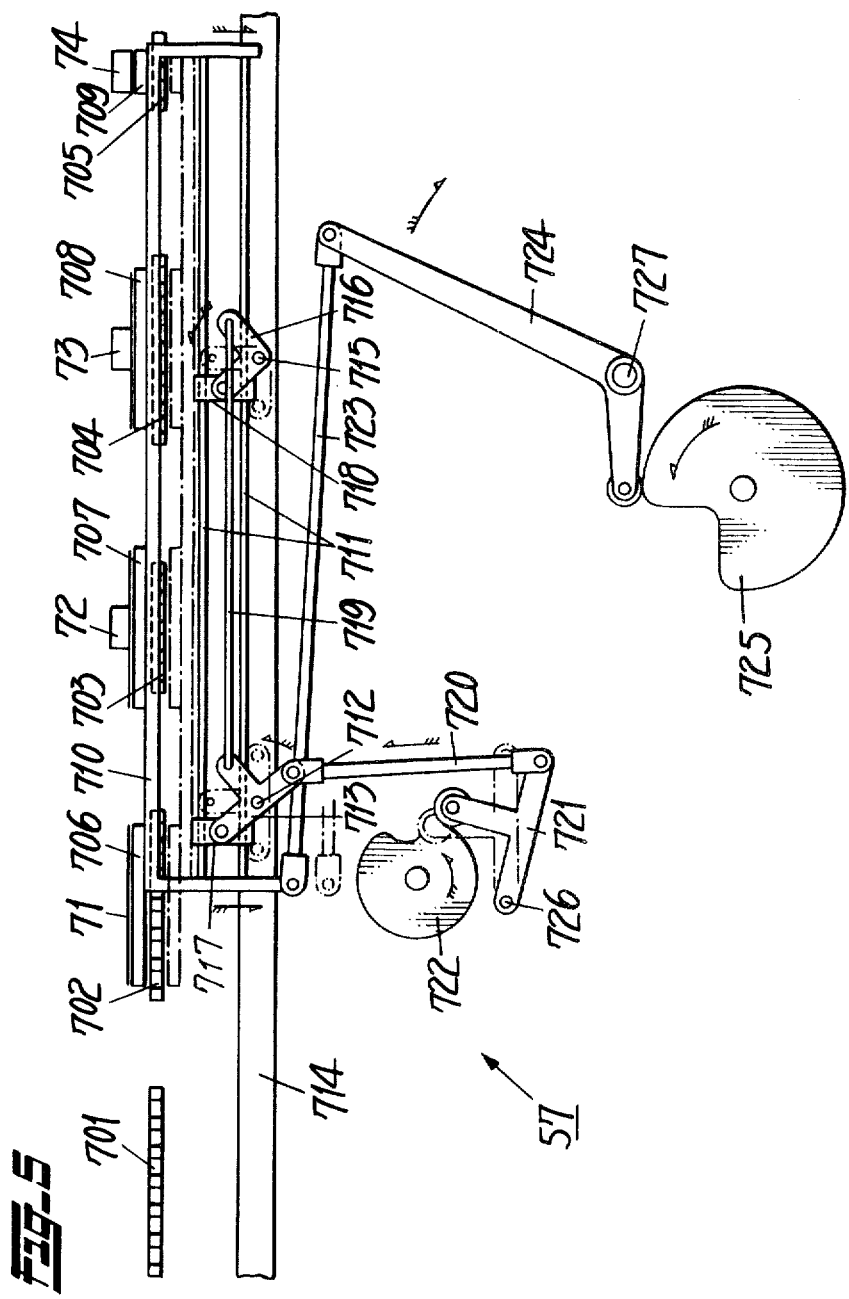

DEVICE FOR CONVEYING ROLLED FOOD

This invention provides a device for transferring rolled food by conveying unfinished materials of one process stage to the next stage simultaneously, and it finishes rolled food after completing a plurality of procedural steps.

In the past, in food manufacturing devices which finish the products after a plurality of stages, the conveyance of semi-finished materials from one stage to the next is usually independent, and accordingly the mechanism of the device of devices is rather complex and costly. In order to reduce the sizes of such devices, it is necessary to simplify the conveying devices. It is very difficult for the independent conveying devices to adjust and control the timing of the entire device.

Therefore, the object of this invention is to provide a simple, compact and reliable device for transferring rolled food.

A further object of the invention is to provide a conveying device for rolled food which can smoothen the whole process at high speed by conveying the semi-finished materials from one stage simultaneously to the next by means of the same action.

The primary object of this invention is to provide a device which moves slide frames horizontally and vertically, on which a plurality of comb-shaped cradles are fixed at equal intervals. This device moves all the materials in the plurality of the stages simultaneously to the subsequent stages.

It should be added at this point that this invention is closely related to those of other applications, filed simultaneously herewith, namely one on a "Device for Wrapping Sheets around Food in Rolled Form and other Food Processing Devices" (incorporating devices for supplying a mixture to dough sheets, another for doubling the sheets, and one for bending them); another on a "Device for Wrapping Sheets around Food"; yet another on a "Device for Processing Dough" (for forming and baking dough sheets); and finally one on a "Dough Processing Device" (preventing dough from sticking) the latter being now U.S Pat. No. 3,881,404 of May 6, 1975. These applications of the inventor were all filed on Mar. 12, 1974, respectively under Ser. Nos. 450,489, -93, -91 and 92.

Other objects and many of the attendant advantages of the invention will be readily appreciated as the same becomes better understood by reference to the following detailed description, when considered with the accompanying drawings, wherein FIG. 1 is an elevation of a device for producing dough sheets and baking them, together with a device for pulling a dough sheet, incorporating further devices, in relation to the inventive device for conveying rolled food;

FIG. 4 is a front view of the devices shown in FIG. 3; and

FIG. 5 is a front view similar to that of FIG. 4 for explaining the operation of the inventive conveying device.

Figure 1:
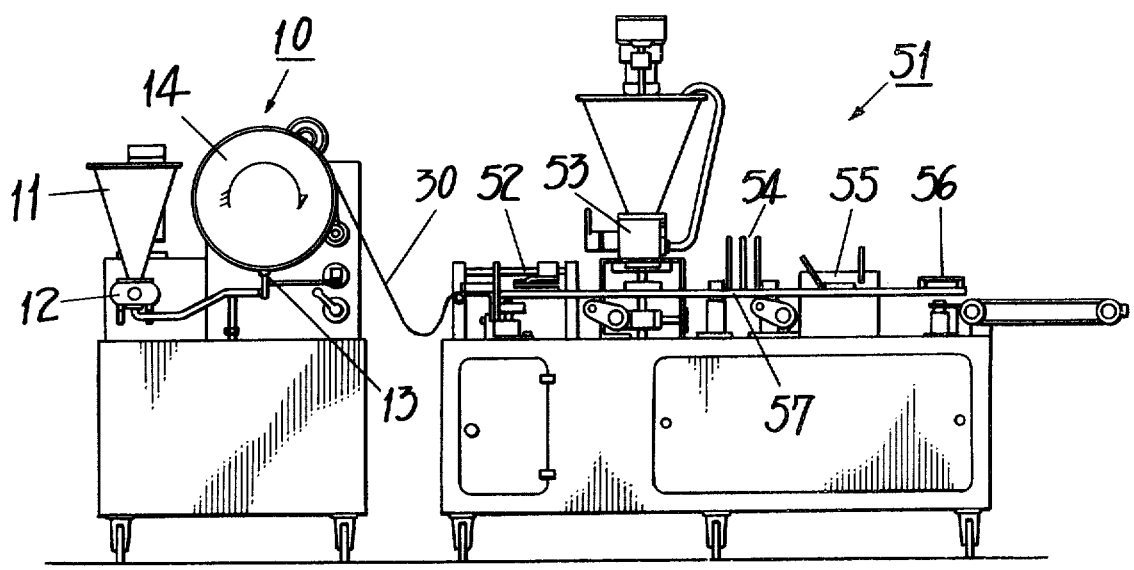
Figure 2:
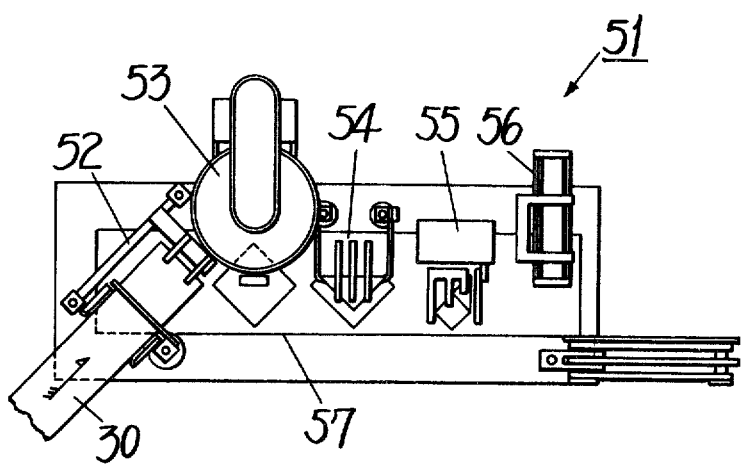
FIG. 2 is a plan view of a main portion of FIG. 2 with details of the inventive device and the pulling device with which it is shown associated.

A device 10 for producing dough sheets as shown in FIG. 1 makes thin sheets from raw materials such as eggs and dough. The raw material is supplied by the operation of a gear pump 12 from a hopper 11 through a slit nozzle 13 on an iron-plate surface of a rotating drum 14 where a continuous belt of a thin dough sheet 30 is made.

A device 51 for pulling the dough sheets includes the above-mentioned device 10, which pulls the sheets 30, a device 52 for cutting up the dough sheets, namely the continuous thin sheets into the desired size, a device 53 for supplying a mixture of food or materials to the dough sheets in a constant amount, a device 54 for doubling the dough sheets 30 along the back of the mixture supplied, a device 55 for bending the dough sheets along both sides of the mixture, a device 56 for wrapping the sheets around the food, namely into a cylindrical shape, and the inventive device 57 for conveying or transferring the sheets 30 from each of the devices 52 to 56 to the next following device at predetermined intervals.

Figure 3:
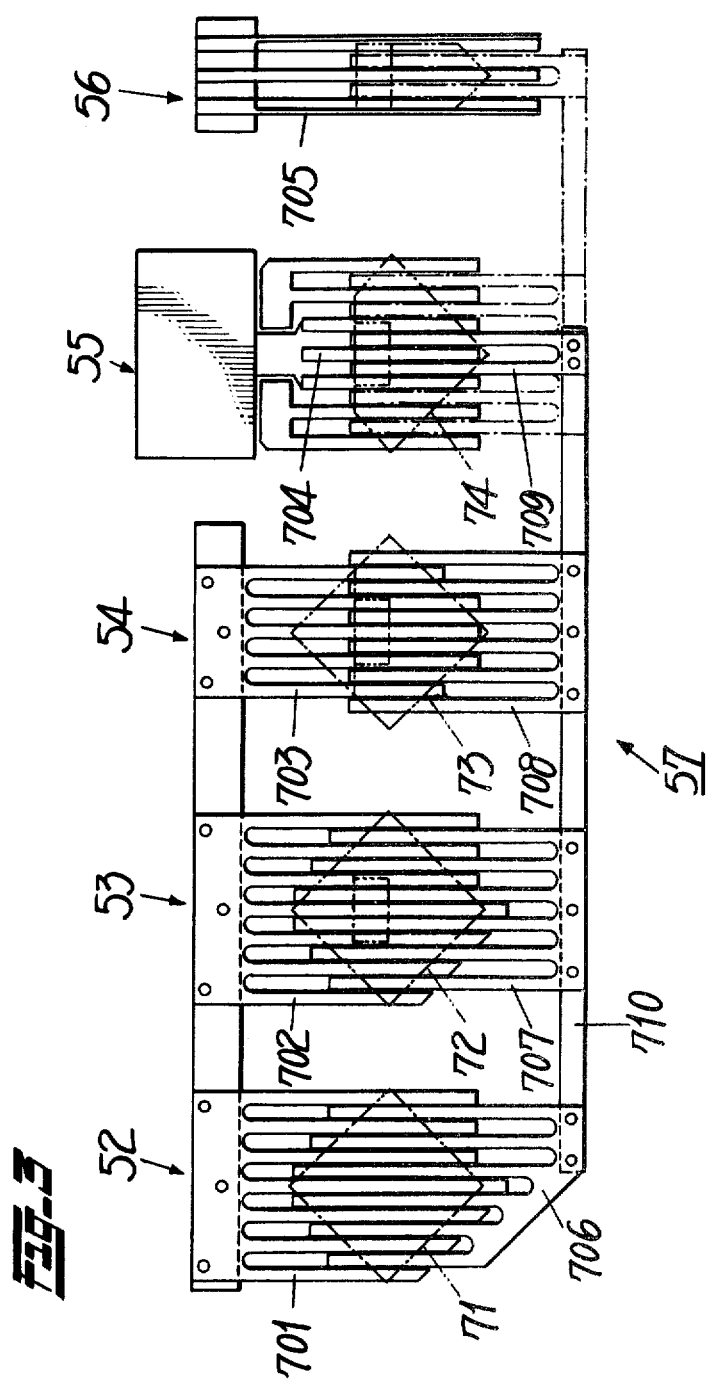
FIG. 3 is a top view of the various devices in which the inventive device is being used, namely for cutting up dough sheets, for supplying a mixture to the sheets, for doubling the sheets, for bending them, and for wrapping the sheets around the food.

Referring now to FIG. 3, cradles 701 to 705 are fixed to the cutting device 52, the mixture supplying device 53, the doubling device 54, the bending device 55 and the wrapping device 56, respectively. These cradles 701 to 705 have the shape of a comb, and they are distributed at equal intervals along their center lines. Travelling cradles 706 to 709 also have shapes like a comb, and they are fixed to a slide frame 710 at equal intervals on their center lines so that they are correspondingly engaged with the cradles 701 to 705.

Referring now to FIG. 5, two guide rods 711 are installed on the frame 710. The center 712 of a T-shaped main crank 713 is secured to a base 714 of the device, and the center 715 of an auxiliary L-shaped crank 716 is secured to the base 714, keeping a constant distance between them.

To one end of the main and the auxiliary cranks 713, 716, respectively, brackets 717, 718 are secured by means of pins so that they support the above-mentioned rods 711 in a way so that these rods can slide horizontally, and the cranks 713, 716 are linked by connecting rods 719.

One end of a rod 720 is secured to the main crank 713 by a pin and the other end to an action rod 721 moved up and down by the rotation of a cam 722. A horizontally travelling rod 723 is secured by a pin to one end of the frame 710, located parallel with the rod 723, and the other end of the travelling rod is secured by a pin to a bell crank 724 moved horizontally left and right by another rotating cam 725.

Elements 726, 727 and 71 through 74 will be mentioned somewhat later.

The operation of the inventive device will now be described with reference to FIGS. 4 and 5. Referring now to the former, if the cam 722 rotates in the direction marked by an arrow, the rod 721 moves downwardly around a shaft 726 which serves as a fulcrum, and the rod 720 rotates the crank 713 around the shaft 712. At this time, the crank 716 rotates in the same direction as the crank 713, around the shaft 712 which is the center of rotation, by means of the rod 719.

The guide rods 711 (viz. the slide frame 710) are pushed upwardly together with the brackets 717, 718 by the rotation of the two cranks. When the frame 710 is pushed upwardly, the travelling cradles 706 to 709 pass upwardly into the clearances of the cradles 701 to 704, fixed to each of the devices 52 to 55, and semi-finished materials identified by numerals 71 to 74 are taken along by them.

Referring now to FIG. 5, if the cam 725 rotates in the direction marked by an arrow, the bell crank 724 rotates around a shaft 727 which serves as a fulcrum, and the frame 710 is moved rightward against the base 714 by the travelling rod 723. The construction in which the guide rods 711 can slide freely against the brackets 717, 718 makes this possible.

Each travelling cradle 706 to 709 comes above the cradles 702 to 705, fixed to the devices of the next process stages, identified by numerals 53 to 56. Further rotation of the cam 722 returns the rod 721 to the original position, and the rod 720 rotates the main crank 713 reversely around the shaft 712, and the slide frame 710 moves downward accordingly.

At this moment, the travelling cradles 706 to 709 pass the fixed cradles 702 to 705 downward, and the materials 71 to 74 are put on the fixed cradles. Further rotation of the cam 725 moves the frame 710 leftward and finally returns it to its original position. When the operations of the individual devices are finished, the next cycle is repeated, and finished products are produced from the semi-finished materials, cycle by cycle.

It should be understood, of course, that the foregoing disclosure relates only to a preferred embodiment and to preferred features of the invention, and that it is intended to cover all changes and modifications of the examples described which do not constitute departures from the spirit and scope of the invention.

What I claim is:

1. A device for conveying rolled food, such as consisting of a mixture of minced vegetables, meat and the like, wrapped in a sheet of dough, prepared by at least two of consecutively disposed mechanisms, performing one of the plural steps of cutting up continuous dough sheets into predetermined sizes, supplying the mixture to the cut dough sheets, doubling the filled dough sheets, bending the filled and doubled dough sheets, and wrapping the latter around the mixture, the device comprising: at least two stationary cradles, each associated with one of the mechanisms; at least two movable cradles; said cradles being all uniformly spaced apart and comb-shaped, with respectively interleaved teeth that clear each other at all times during the movements of said movable cradles; means for reciprocating said movable cradles vertically with respect to said fixed cradles, up and to a level above them in a first phase, and down again to a level below them in a third phase, the latter movement with respect to a subsequent one of said fixed cradles; means for reciprocating said movable cradles longitudinally with respect to at least two subsequent ones of said fixed cradles, in one direction above them in a second phase, and in the opposite direction below them in a fourth phase; and a control mechanism for cyclically correlating the movements of said movable cradles with those of the mechanisms.

2. The device as defined in claim 1, further comprising at least one slide frame movable with respect to stationary portions of the device for carrying said movable cradles during the longitudinal and vertical movements thereof; said stationary cradles being supported by the respective mechanisms on one ends thereof, while said movable cradles are carried by said slide frame at other ends thereof that are opposite to said one ends of the fixed cradles.

3. The device as defined in claim 2, wherein said means for longitudinal reciprocation of the movable cradles includes a bell-crank mechanism controlled by a cam mechanism; and a travelling rod linking said bell-crank mechanism to said slide frame.

4. The device as defined in claim 2, wherein said means for vertical reciprocation of the movable cradles includes a second bell-crank mechanism controlled by a second cam mechanism; and a guide mechanism linking said second bell-crank mechanism to said slide frame.

5. The device as defined in claim 4, wherein said guide mechanism includes at least one guide rod fixed to said slide frame; brackets freely slidable on said rods; and at least one crank mechanism controlled by said second bell-crank mechanism.

* * * * *